United States Patent [19]

Salters et al.

[11] 3,862,435

[45] Jan. 21, 1975

[54] DIGITAL SHIFT REGISTER

[75] Inventors: Roelof Herman Willem Salters; Lieuwe Boonstra; Cornelis Willem Lambrechtse, all of Emmasingel, Eindhoven, Netherlands

[73] Assignee: U.S. Philips Corporation, New York, N.Y.

[22] Filed: Aug. 7, 1973

[21] Appl. No.: 386,335

[30] Foreign Application Priority Data

Sept. 7, 1972 Netherlands ....................... 7212151

[52] U.S. Cl. ............................. 307/221 C, 307/304

[51] Int. Cl. ....................... G11c 19/00, H03k 23/30

[58] Field of Search ........ 307/220 C, 221 C, 222 C, 307/223 C, 224 C, 225 C, 279, 304, 313

[56] References Cited

UNITED STATES PATENTS

| | | | |
|---|---|---|---|
| 3,322,974 | 5/1967 | Ahrons et al. | 307/221 C |
| 3,573,509 | 4/1971 | Crawford | 307/221 C |
| 3,576,447 | 4/1971 | McKenny | 307/221 C |
| 3,588,526 | 6/1971 | Cricchi | 307/221 C |
| 3,716,723 | 2/1973 | Heuner et al. | 307/221 C |

*Primary Examiner*—Stanley D. Miller, Jr.
*Attorney, Agent, or Firm*—Frank R. Trifari; Simon L. Cohen

[57] ABSTRACT

A digital shift register comprising a series connection of a number of source-followers, the input of each source-follower being connected both to a storage capacitance and to an electronic switch for establishing the reference level at the relevant capacitance. Between the inputs of at least some of the source-followers and the associated clock lines variable capacitances are included. The variable capacitances serve to compensate for the voltage losses occurring the source-followers as a result of the threshold voltages of the transistors employed in said source-followers.

6 Claims, 6 Drawing Figures

DIGITAL SHIFT REGISTER

The invention relates to a digital shift register, comprising a chain of series-connected unity-gain amplifiers, hereinafter called signal-followers, the input of each signal follower being connected both to a capacitance and to an electronic switch for establishing the reference level at the associated capacitance and two adjacent signal-followers being connected to two separate clock lines. The unity-gain amplifiers are of the type having a control input and a main conduction path, wherein current through the main conduction path is controlled by the potential between the control input and one end of the main conduction path, and wherein the output is provided on the one end of the main conduction path. Such unity-gain amplifiers include emitter-followers and source-followers.

More in particular the invention relates to a shift register which is integrated in a semiconductor body. The trend is to increasingly minimize the dimensions of the present shift registers. The object of this is to attain a reduction of the costs and an increase of the shift rate. Owing to the reduction of the dimensions of the shift register the packing density increases and thus the power dissipation per unit of area of the semiconductor element. The quotient of the dissipation and the shift rate is, for example, a measure of the quality of the shift register. The general tendency is to minimize this quotient so far as possible. A shift register of this type is described in Netherlands Patent Application No. 6,813,329 (FIG. 5) corresponding to U.S. Pat. No. 3,712,988. In this shift register the signal-followers are constituted by field-effect transistors whose source electrodes are connected to the gate electrode of the subsequent transistor. The drain electrodes of two consecutive transistors are connected to two separate clock lines. The capacitances are connected both to the source electrodes of the associated transistors and to one of two clock lines, adjacent capacitances being connected to different clock lines. In the known shift register the electronic switches are formed by diodes whose anodes are connected to the gates of the associated transistors and whose cathodes are connected to a fifth or a sixth clock line, adjacent diodes being connected to different clock lines. By applying an operating voltage to the clock lines which are connected to the drain electrodes of the transistors, the charging voltage of the preceding capacitance is transferred to a next capacitance. To compensate for the difference in direct voltage (threshold voltage) between the inputs and outputs of each signal-follower, pulses whose amplitude corresponds to the said difference are applied to the clock lines which are connected to the capacitances. This ensures that when the voltage is transferred to the next capacitance the voltage at the cathodeside terminal of a capacitance equals the voltage which existed at the gate electrode of the associated transistor during charging of the capacitance.

The method of threshold-voltage compensation described above requires two additional clock lines. These clock lines occupy space on the semiconductor body to be used, which space is therefore no longer available for the integration of circuit elements, such as transistors and capacitances. This reduces the maximum packing density. For a correct operation of the shift register described above the individual threshold voltages of all field-effect transistors should exactly be compensated for. As the threshold voltages of the field-effect transistors on the semiconductor body differ from transistor to transistor, all the said threshold voltages cannot be compensated by means of one selected compensation voltage. The so-called "back-gate" effect (effect of substrate voltage of the threshold voltage) adversely affects the correct operation of the shift register. When the source-substrate voltage of a field-effect transistor increases, the threshold voltage increases considerably. This means that when a logic 0 is applied to the gate of a field-effect transistor a different compensation voltage is required than if a logic 1 were applied. The value of the amplitude of the compensation pulses is also determined by the quotient of the capacitance values of the relevant capacitance and the input capacitance of the field-effect transistor by which it is followed. To avoid a high amplitude of the compensation pulses, the relevant capacitances should be comparatively high. Higher capacitances take up more space on the semiconductor body, thus reducing the maximum packing density and also the maximum shift rate.

It is an object of the invention to eliminate said drawbacks and to provide a shift register, which has a high packing density and whose maximum shift rate is very high. The invention is characterized in that variable capacitances are included between the input of at least part of the signal-followers and the clock lines connected thereto.

The invention will be described with reference to the drawing.

Figure 3:
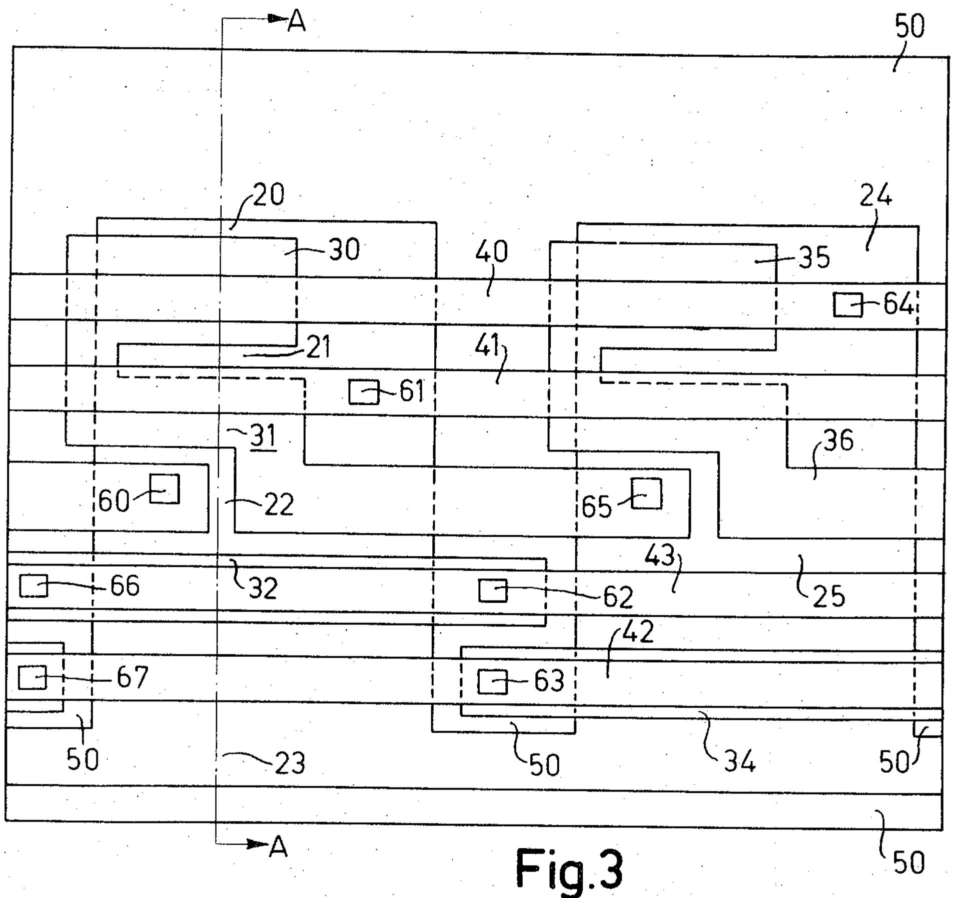
FIG. 3 is a schematic top plan view of an embodiment of the integrated shift register according to the invention.
Figure 4:
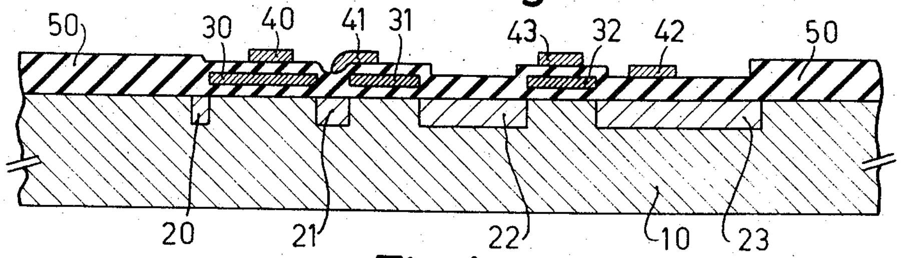

FIG. 4 schematically shows a cross-section taken on the line A in FIG. 3.

Figure 1:
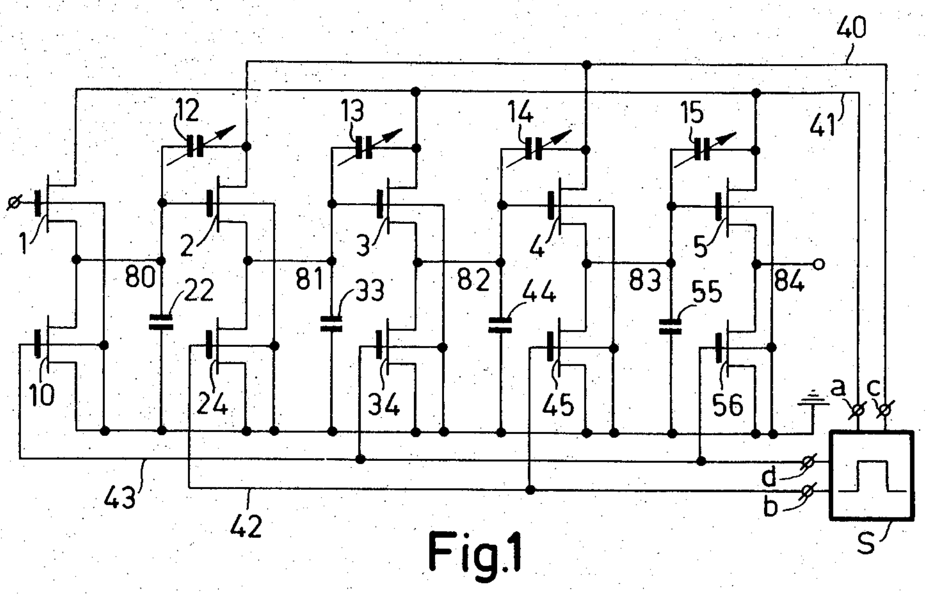
FIG. 1 shows an embodiment of the digital shift register according to the invention.
Figure 5:
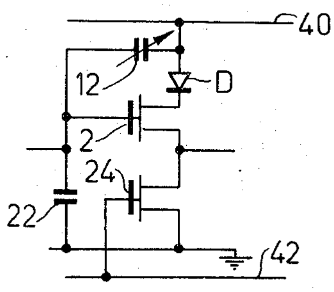

FIG. 5 shows a shift-register stage for use in the shift register according to FIG. 1.

Figure 6:
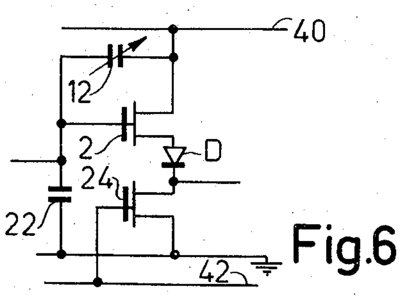

FIG. 6 shows a different shift-register stage for use in the shift register according to FIG. 1.

In FIG. 1 the signal-followers are formed by the field-effect transistor 1, 2, 3, 4 and 5. These transistors are of the insulated-gate type. The source of each of the transistors 1 to 4 is connected to the gate of the next field-effect transistor. The drain electrodes of the transistors 1, 3 and 5 are connected to the clock line 41, which line is connected to the output *a* of the switching voltage source S. The drain electrodes of the transistors 2 and 4 are connected to the clock line 40, which clock line is connected to the output *c* of the switching voltage source S. The electronic switches are constituted by the field-effect transistors 10, 24, 34, 45 and 56, whose sources are connected to a point of constant potential. The drains of the transistors 10, 24, 34, 45 and 56 are connected to the source of the respective transistors 1, 2, 3, 4 and 5. The gates of the transistors 10, 34 and 56 are connected to a clock line 43, which line is connected to the output *d* of the switching voltage source S. The gates of the transistors 24 and 25 are connected to the clock line 42, which line is connected to the output *b* of the switching voltage source S. Between the gates and drains of the respective transistors 2, 3, 4 and 5, the respective variable capacitances 12,

13, 14 and 15 are included. The capacitances 22, 33, 44 and 55 are stray capacitances and their dimensions are minimized by choosing a suitable lay out. The operation of the shift register according to the invention is as follows.

Figure 2:
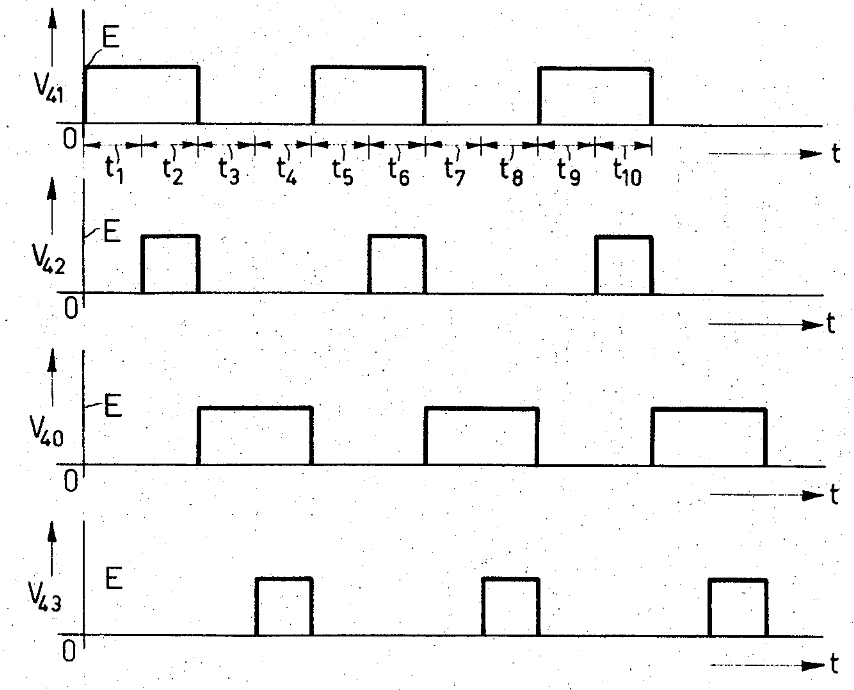
FIG. 2 is a voltage diagram of the voltages supplied by the switching voltage source.

In the time interval $t_1$ a voltage on the clock line 41 is +E volts, while the voltages of the other clock lines are 0 volts,, see FIG. 2. It is assumed that in this time interval a logic 1, for example ½ E volts, is present at the gate electrode of the transistor 1 and that ½E> 2 V, V being the threshold voltage of a field-effect transistor. The capacitance existing at the junction 80 will then be charged until a voltage drop of (½E−V) is obtained. In this respect it is to be noted that the capacitance existing at the junction is constituted by the sum of the capacitances 12 and 22. As the voltage at junction 80 is greater than the threshold voltage, the capacitance 12 will be high. The operation of these and other variable capacitances will be discussed further in the description. In the time interval $t_2$ the voltage on the clock line 42 also equals +E volts. The transistor 24 is now conducting and discharges the overall capacitance existing on the junction 81, until the voltage across said capacitance has become 0 volts, which is the reference level.

In the time interval $t_3$ the voltage on the clock line 40 equals +E volts, while the voltages on the other clock lines equal 0 volts. In this time interval the voltage at the gate of the transistor 2 will become $(E/1 + \alpha) + (½E-V)$ volts, in which $\alpha = C22/C12$ and C22 is the capacitance value of the transistor 22 and C12 is the capacitance value of the capacitance C12. The capacitance C22 is generally low relative to the capacitance 12 so that the factor $\alpha$ will be appreciably smaller than 1, as a result of which the increase of the voltage at the gate of transistor 2 will substantially equal E volts in the time interval under consideration. Owing to said voltage increase the transistor 2 will become highly conducting, so that the capacitance at the junction 81 is charged very rapidly until the voltage is E volts.

In the time interval $t_4$ the transistors 10 and 34 are conducting so that the capacitances at the junction 80 and 82 will be discharged. Transistor 3 is then no longer conducting and junction 81 is disconnected from the clock line 40. This demonstrates that after two clock cycles the information has been shifted from the input of the shift register to junction 81 and has also been amplified to the maximum value of the clock voltage. Two identical clock cycles $t_5$–$t_8$ will transfer the information from junction 81 to junction 83 in an identical manner while maintaining the amplitude. After the time interval $t_8$ new information can be applied to the input of the shift register. Accordingly one bit unit of the shift register comprises four stages with two transistors each.

The shift register according to the invention may, for example, be integrated as is shown in the top plan view of FIG. 3 and the longitudinal section of FIG. 4. The top plan view of FIG. 3 shows the transistors 2, 3, 24, 34 and the capacitances 12, 13, 22 and 33. The zone 24 corresponds to the drain of transistor 2 and is connected to the conductor track 40 via the contact hole 64. The zone 25 corresponds to the source of transistor 2 and also constitutes the drain of transistor 24. The zone 25 is connected to the gate 31 of transistor 3 via the contact hole 65. The gate 36 of transistor 2 is connected to a conductive layer 35, which forms a capacitor plate of the variable capacitance 12. The gate electrode 34 of the transistor 24 is connected to the conductor track 42 via the contact hole 63. Zone 20, 21 corresponds to the drain electrode of transistor 3 and is connected to the conductor track 41 via the contact hole 61. Zone 22 corresponds to the source electrode of the transistor 3 and also forms the drain of transistor 34. The gate 31 of the transistor 3 is connected to a conductive layer 30, which constitutes a capacitor plate of capacitance 13. The gate 32 of transistor 34 is connected to the clock line 43 via contact holes 62 and 66. Zone 23 corresponds to the source of transistors 24, and 34. Zones 20, 21, 22, 23, 24, 25 are formed in the semi-conductor body 10 by diffusion. The conductor tracks 40, 41, 42 and 43 are, for example, made of aluminium, while for the conductive layers 30, 31, 32, 34, 35 and 36 it is advantageous to use polycrystalline silicon with a suitably selected impurity.

As described, the conductive layer 30 (see FIG. 4) forms a plate of the variable capacitance 13, which conductive layer is connected to the conductive layer 31 which forms the gate electrode of the transistor 3. When the voltage at the conductive layer 31 remains below the threshold voltage of the transistor 3, a very small overlapping capacitance will exist between zone 22 and the conductive layer 31. A capacitance also exists between the conductive layer 30 and the substrate 10. When the voltage at the conductive layer 31 exceeds the threshold voltage of the transistor 3, an inversion layer is obtained underneath the conducting layers 30 and 31. Owing to the presence of the inversion layer underneath the conductive layer 30 the capacitance, which initially existed between said conductive layer and the substrate, is connected in parallel with the overlapping capacitance already exixting between the zone 22 and the conductive layer 31. In other words, if a logic 0 is present at the gate of transistor 3 a very small capacitance exists between this gate electrode and the drain electrode, and if a logic 1 is present the capacitance between the gate and drain electrodes is high. When a capacitance, as has just been described, is included between the gate and the drain of a field-effect transistor, for example capacitance 12 in FIG. 1, the effect of this capacitance is increased by the effect of the input capacitance of this transistor. The input capacitance of said transistor is partly present between the gate and drain electrodes (i.e. in parallel with capacitance 12) and partly between the gate and source electrodes. These capacitances are high only if the voltage at the gate of the transistor is higher than the threshold voltage of the transistor.

According to the present description a bit unit of the shift register of FIG. 1 consists of four stages with two transistors each. Instead of using 2 clock cycles and four stages per bit, is also possible to use 3 cycles and three stages per bit. Instead of 2 clock lines 40 and 41 three clock lines are used, while instead of the 2 clock lines 42 and 43 three clock lines are used. The information rate and bit density is thus increased by a factor four/thirds. By including a diode D between the variable capacitance 12 and the drain of the transistor 2, as shown in FIG. 5 for one shift-register stage, this number may be reduced still further to 2. The inclusion of the diode D ensures that the transistor 2 passes current in one direction only, so that now new information may be read in after every two shift-register stages. This enables both the information transfer and the bit density to be increased by a factor 2. It is also possible to include the diode D, as is indicated in FIG. 6 for one stage, between the source of transistor 2 and the drain of transistor 24.

It will be evident that the scope of the invention is not limited to the embodiments given hereinbefore and that for a person skilled in the art many modifications are possible within the scope of the invention. For example, signal-followers other than those used in FIG. 1 may be employed. In addition to its use as a series shift-register, the shift register may also be employed as a series-parallel converter. Furthermore, it is advantageous to use the shift register as a circuit for the realization of time marking at a very high clock frequency, for example 40 MHz.

What is claimed is:

1. A digital shifter register, of the type comprising a chain of signal-followers, having control inputs and main conduction paths, the control input of each signal-follower being connected both to a storage capacitance and to an electronic switch for establishing a reference level at the associated storage capacitance, wherein the current through the main conduction path of each signal-follower varies as a function of potential in excess of a threshold level between the control input and one end of the main conducting path, the signal-followers being connected in cascade through the control inputs and said one ends of said main conducting paths, two adjacent signal followers being connected to two separate clock lines, the improvement comprising voltage variable capacitances connecting the control input of at least one of the signal followers to the clock lines which are connected thereto, said variable capacitances having higher capacitance in response to potentials thereacross exceeding the threshold level of the signal follower connected thereto then the capacitance resulting from a potential lower than said threshold level.

2. A digital shift register as claimed in claim 1, wherein the signal-followers are formed by field-effect transistors, the source electrode of each field-effect transistor being connected to the gate electrode of the next field-effect transistor, the drain electrodes of two consecutive field-effect transistors being connected to separate clock lines, characterized in that the electronic switches are constituted by the field-effect transistors, whose source electrodes are connected to a point of constant potential, the drain electrodes being connected to the source electrodes of the associated field-effect transistors.

3. A digital shift register as claimed in claim 2, wherein diodes connect the variable capacitances to the drain electrodes of the associated field-effect transistors.

4. A digital shift register as claimed in claim 2, wherein diodes connect the source electrodes of the field-effect transistors which form the emitters followers to the electronic switches which are connected thereto.

5. A digital shift register as claimed in claim 2 wherein the field-effect transistors are of the insulated-gate type.

6. A digital shift register as claimed in claim 1, wherein said register is integrated in a semiconductor body.

* * * * *